(12) United States Patent
Hayama et al.

(10) Patent No.: US 10,690,125 B2
(45) Date of Patent: Jun. 23, 2020

(54) DISPLACEMENT CONTROL VALVE

(71) Applicant: EAGLE INDUSTRY CO., LTD., Tokyo (JP)

(72) Inventors: Masahiro Hayama, Tokyo (JP); Hideki Higashidozono, Tokyo (JP); Kohei Fukudome, Tokyo (JP); Daichi Kurihara, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 27 days.

(21) Appl. No.: 16/085,428

(22) PCT Filed: Mar. 10, 2017

(86) PCT No.: PCT/JP2017/009642
§ 371 (c)(1),
(2) Date: Sep. 14, 2018

(87) PCT Pub. No.: WO2017/159553
PCT Pub. Date: Sep. 21, 2017

(65) Prior Publication Data
US 2019/0078562 A1 Mar. 14, 2019

(30) Foreign Application Priority Data
Mar. 17, 2016 (JP) .................. 2016-054050

(51) Int. Cl.
*F16K 11/02* (2006.01)
*F04B 27/18* (2006.01)
(Continued)

(52) U.S. Cl.
CPC .......... *F04B 27/18* (2013.01); *F04B 27/1804* (2013.01); *F04B 49/12* (2013.01);
(Continued)

(58) Field of Classification Search
None
See application file for complete search history.

(56) References Cited

U.S. PATENT DOCUMENTS 8,079,827 B2 * 12/2011 Iwa ............... F04B 27/1804
137/3
2003/0145615 A1 * 8/2003 Sasaki ............ F04B 27/1804
62/228.3
(Continued)

FOREIGN PATENT DOCUMENTS

JP    2008-031962 A    2/2008
JP    5167121 B2       3/2013
(Continued)

*Primary Examiner* — John Fox
(74) *Attorney, Agent, or Firm* — Harness, Dickey & Pierce, P.L.C.

(57) ABSTRACT

A displacement control valve improved in the function of discharging a liquid refrigerant in a control chamber at startup achieves a reduction in startup time and an improvement in operating efficiency during control of a variable displacement compressor simultaneously. An opening area between a third valve section and a third valve seat surface in a control area to control the flow rate or pressure in a working control chamber is set smaller than an area of an auxiliary communicating passage, thereby reducing the minimum area of a Pc-Ps flow path in the control area.

13 Claims, 8 Drawing Sheets

(51) Int. Cl.
*F04B 49/12* (2006.01)
*F16K 11/07* (2006.01)
(52) U.S. Cl.
CPC ............ *F16K 11/02* (2013.01); *F16K 11/025* (2013.01); *F16K 11/0716* (2013.01); *F04B 2027/1813* (2013.01); *F04B 2027/1827* (2013.01); *F04B 2027/1831* (2013.01); *F04B 2027/1859* (2013.01); *F04B 2201/0206* (2013.01)

(56) References Cited

U.S. PATENT DOCUMENTS

| | | |
|---|---|---|
| 2009/0183786 A1 | 7/2009 | Iwa et al. |
| 2012/0198992 A1 | 8/2012 | Futakuchi et al. |
| 2016/0290326 A1* | 10/2016 | Sugamura ........... F04B 27/1804 |

FOREIGN PATENT DOCUMENTS

| | | |
|---|---|---|
| WO | WO-2007-0119380 A1 | 10/2007 |
| WO | WO-2011-0114841 A1 | 9/2011 |

* cited by examiner

DISPLACEMENT CONTROL VALVE

CROSS-REFERENCE TO RELATED APPLICATIONS

This application is a U.S. National Stage Application of International Application No. PCT/JP2017/009642, filed on Mar. 10, 2017, and published in Japanese as WO 2017/159553 on Sep. 21, 2017 and claims priority to Japanese Application No. 2016-054050, filed on Mar. 17, 2016. The entire disclosures of the above applications are incorporated herein by reference.

BACKGROUND

Technical Field

The present invention relates to a displacement control valve that variably controls the displacement or pressure of a working fluid, and more particularly, relates to a displacement control valve that controls the discharge rate of a variable displacement compressor or the like used in an air-conditioning system of an automobile or the like, according to pressure load.

Related Art

A swash-plate variable displacement compressor used in an air-conditioning system of an automobile or the like includes a rotating shaft rotationally driven by the torque of an engine, a swash plate connected to the rotating shaft such that its inclination angle to the rotating shaft can be changed, compression pistons connected to the swash plate, and others. The compressor controls the discharge rate of a refrigerant gas by changing the inclination angle of the swash plate and thereby changing the stroke of the pistons.

The inclination angle of the swash plate can be continuously changed by properly controlling the pressure in a control chamber (crank chamber), using a displacement control valve that is driven by an electromagnetic force to open and close, and thereby adjusting the balance of pressures acting on opposite faces of the pistons, while using the suction pressure in a suction chamber for sucking the refrigerant gas, the discharge pressure in a discharge chamber for discharging the refrigerant gas pressurized by the pistons, and the control chamber pressure in the control chamber housing the swash plate.

As such a displacement control valve, there is known one that includes, as shown in FIG. 7, second communicating passages 73 and a valve hole 77 that communicate a discharge chamber and a control chamber, a second valve chest 82 formed at an intermediate point in a discharge-side passage, third communicating passages 71 and a circulation groove 72 that communicate a suction chamber and the control chamber, a third valve chest 83 formed at an intermediate point in a suction-side passage, a valve element 81 formed such that a second valve section 76 that is disposed in the second valve chest 82 to open and close the second communicating passages 73 and the valve hole 77 and a third valve section 75 that is disposed in the third valve chest 83 to open and close the third communicating passages 71 and the circulation groove 72 reciprocate in an integrated manner while performing opening and closing operation in opposite directions, a first valve chest (displacement chamber) 84 formed close to the control chamber, a pressure-sensitive element (bellows) 78 that is disposed in the first valve chest and exerts a biasing force in the extending (expanding) direction and contracts with an increase in ambient pressure, a valve seat element (engaging portion) 80 that is provided at a free end of the pressure-sensitive element in the extending and contracting direction and has an annular seat surface, a first valve section (opening valve connection portion) 79 that moves with the valve element 81 in an integrated manner in the first valve chest 84 and can open and close the suction-side passage by being engaged with and disengaged from the valve seat element 80, a solenoid S that exerts an electromagnetic drive force on the valve element 81, and others (Hereinafter, it is referred to as a "conventional art." See JP 5167121, for example).

A displacement control valve 70 is configured to be able to adjust the pressure in the control chamber (control chamber pressure) Pc by communicating the discharge chamber and the control chamber when there arises a need to change the control chamber pressure during displacement control, without having to provide a clutch mechanism to the variable displacement compressor. The displacement control valve 70 is also configured to open the suction-side passage by disengaging the first valve section (opening valve connection portion) 79 from the valve seat element (engaging portion) 80 and thereby communicating the suction chamber and the control chamber when the control chamber pressure Pc increases in the variable displacement compressor in a stopped state.

When the swash-plate variable displacement compressor that has been stopped and left standing for a long period of time is started, a liquid refrigerant (a refrigerant gas cooled and liquefied while the compressor being left standing) has accumulated in the control chamber (crank chamber). Thus, unless the liquid refrigerant is discharged, a discharge rate as set cannot be achieved by the compression of the refrigerant gas.

To perform desired displacement control immediately after startup, it is necessary to discharge the liquid refrigerant in the control chamber (crank chamber) as rapidly as possible.

For this, the above conventional art provides an auxiliary communicating passage 85 in the valve seat element (engaging portion) 80 to enable communication from the displacement chamber 84 through the auxiliary communicating passage 85 and an intermediate communicating passage 86 to the third communicating passages 71 under a suction pressure (see an arrow). When the variable displacement compressor is started for cooling, this configuration enables the vaporization of the refrigerant liquid in the control chamber at 1/10 to 1/15 the speed of a displacement control valve without the auxiliary communicating passage 85, to bring the compressor into cooling operation.

FIG. 7 is a state where a current is flowing through the solenoid unit S. When no current is flowing through the solenoid unit S, an opening spring means 87 brings the third valve section 75 into a closed state, which is not shown. At this time, the second valve section 76 is in an open state. The first valve section 79 opens under the suction pressure Ps and the control pressure Pc.

The first valve section 79 and the valve seat surface of the valve seat element 80 are configured such that they cannot open widely for functional reasons. The refrigerant liquid in the control chamber is vaporized, and the fluid at the control pressure Pc flows through first communicating passages 74 into the first valve chest 84. In this state, the control pressure Pc and the suction pressure Ps are high, and thus the pressure-sensitive element (bellows) 78 contracts, opening a space between the first valve section 79 and the valve seat surface of the valve seat element 80. Only with this valve opening state, however, the vaporization of the refrigerant liquid in the control chamber is accelerated only in small quantities. The provision of the auxiliary communicating passage 85 communicating with the intermediate communicating passage 86 allows the refrigerant liquid in the control chamber to be vaporized rapidly.

In the above conventional art, however, the refrigerant gas flows from the control chamber into the suction chamber even when the space between the first valve section 79 and the valve seat surface of the valve seat element 80 is in a closed state and the flow of the fluid through the auxiliary communicating passage 85 is unnecessary, for example, during the control of the variable displacement compressor, thus resulting in a reduction in the operating efficiency of the variable displacement compressor.

This point will be described in detail with reference to FIG. 8.

In FIG. 8, the conventional art is designed as follows:

$$S2 > S1$$

$$L > LS$$

where S1 is the (fixed) area of the auxiliary communicating passage 85, S2 is the maximum opening area of the third valve section 75, L (stroke from full closing to full opening) is the maximum stroke of the valve element 81, and LS is the stroke of the valve element 81 in a control area.

Therefore, the refrigerant gas defined by the area S1 of the auxiliary communicating passage 85 flows from the control chamber into the suction chamber in the whole control area, and the flow of the refrigerant gas is restricted only after the valve element 81 exceeds the control area and approaches the maximum stroke. Thus, the variable displacement compressor cannot avoid a reduction in operating efficiency during control.

SUMMARY OF THE INVENTION

The present invention has been made to solve the above-described problem of the conventional art, and its object is to provide a displacement control valve that is provided with an auxiliary communicating passage to be improved in the function of discharging a liquid refrigerant in a control chamber at the time of startup of a variable displacement compressor, in which an opening area of a third valve section for opening and closing third communicating passages and a circulation groove during the control of the variable displacement compressor is set smaller than or equal to an opening area of the auxiliary communicating passage so that the displacement control valve can achieve a reduction in startup time and an improvement in operating efficiency during control of the variable displacement compressor simultaneously.

To attain the above object, a displacement control valve according to a first aspect of the present invention is a displacement control valve that controls a flow rate or pressure in a working control chamber according to a degree of opening of a valve unit, including a valve body having a first valve chest that communicates with first communicating passages for passing fluid at control pressure, a second valve chest that has a second valve seat surface for a valve hole communicating with the first valve chest and communicates with second communicating passages for passing fluid at discharge pressure, and a third valve chest that communicates with third communicating passages for passing fluid at suction pressure and has a third valve seat surface, a valve element disposed in the valve body and having an intermediate communicating passage communicating with the first valve chest and the third communicating passages, the valve element having a second valve section that separates from and comes into contact with the second valve seat surface to open and close the valve hole communicating with the first valve chest and the second valve chest, a third valve section that opens and closes opposite to, and in conjunction with, the second valve section and separates from and comes into contact with the third valve seat surface to open and close communication between the intermediate communicating passage and the third communicating passages, and a first valve section that is disposed in the first valve chest and opens and closes in the same direction as, and in conjunction with, the second valve section, a pressure-sensitive element that is disposed in the first valve chest and extends and contracts in response to suction pressure, the pressure-sensitive element having, at an extending and contracting free end thereof, a valve seat that separates from and comes into contact with the first valve section to open and close communication between the first valve chest and the intermediate communicating passage, an auxiliary communicating passage provided in the first valve section in the first valve chest or in the valve seat for the first valve section, for enabling communication between an interior of the first valve chest and the intermediate communicating passage, a solenoid unit mounted to the valve body for actuating the valve element in a travel direction to open and close the valve sections of the valve element according to a current, in which an opening area S2 between the third valve section and the third valve seat surface in a control area to control the flow rate or pressure in the working control chamber is set smaller than an area S1 of the auxiliary communicating passage.

According to this aspect, the displacement control valve, which is provided with the auxiliary communicating passage to be improved in the function of discharging the liquid refrigerant in the control chamber at the time of startup of the variable displacement compressor, can reduce the minimum area of a Pc-Ps flow path in the control area, and can achieve a reduction in startup time and an improvement in operating efficiency during control of the variable displacement compressor simultaneously.

According to a second aspect of the present invention, in the displacement control valve in the first aspect, a maximum opening area S2max between the third valve section and the third valve seat surface with the second valve section in a closed state is set equal to or substantially equal to the area S1 of the auxiliary communicating passage.

According to this aspect, the minimum area of the Pc-Ps flow path at the time of liquid refrigerant discharge can be made as large as that in the above-described conventional art.

According to a third aspect of the present invention, in the displacement control valve in the first or second aspect, in the course of travel of the valve element from a closed state of the second valve section to a closed state of the third valve section, production of the opening area S2 between the third valve section and the third valve seat surface changes from production by a travel direction gap in the travel direction of the valve element to production by a radial gap in a radial direction that is at right angles to the travel direction of the valve element, and the radial gap is set smaller than the area S1 of the auxiliary communicating passage.

According to this aspect, the minimum area of the Pc-Ps flow path can be decreased rapidly from an early stage (a stage where the stroke of the valve element is small) in the control area, and can be maintained at small values until a late stage (a stage where the stroke of the valve element is large) in the control area. Thus, operating efficiency can be improved over the entire range of the control area.

According to a fourth aspect of the present invention, in the displacement control valve in any one of the first to third aspects, the third valve seat surface is formed in a stepped shape including a large-diameter portion extending on a second valve chest side in the travel direction of the valve element, a valve seat extending continuously from the large-diameter portion in a direction that is at substantially right angles to the travel direction of the valve element, and a small-diameter portion extending continuously from the valve seat toward a proximal end, and the third valve section opposite the third valve seat surface has an opposing surface portion that is opposite the large-diameter portion and is smaller in diameter than the large-diameter portion and larger in diameter than the small-diameter portion, and a contact portion that can be brought into contact with the valve seat.

According to this aspect, the simple configuration can make the minimum area of the Pc-Ps flow path at the time of liquid refrigerant discharge as large as that in the above-described conventional art, and can reduce the minimum area of the Pc-Ps flow path in the control area, thus enabling provision of the displacement control valve that can achieve a reduction in startup time and an improvement in operating efficiency during control of the variable displacement compressor simultaneously.

According to a fifth aspect of the present invention, in the displacement control valve in any one of the first to third aspects, the third valve seat surface is formed in a cylindrical shape having an inner-diameter surface portion, an outer-diameter surface portion, and a valve seat extending in a direction that is at right angles to the travel direction of the valve element, and the third valve section opposite the third valve seat surface is formed in a stepped shape including an outer-diameter surface portion larger in diameter than the inner-diameter surface portion, a contact portion that extends continuously from the outer-diameter surface portion of the third valve section in a radially inward direction that is a direction at substantially right angles to the travel direction of the valve element, and can be brought into contact with the valve seat, an inclined portion that extends continuously from the contact portion, is smaller in diameter than the inner-diameter surface portion, and is inclined radially inwardly away from the second valve section, and a step extending continuously from the inclined portion in a radially inward direction that is a direction at substantially right angles to the travel direction of the valve element.

According to this aspect, the simple configuration can make the minimum area of the Pc-Ps flow path at the time of liquid refrigerant discharge as large as that in the above-described conventional art, and can reduce the minimum area of the Pc-Ps flow path in the control area, thus enabling provision of the displacement control valve that can achieve a reduction in startup time and an improvement in operating efficiency during control of the variable displacement compressor simultaneously.

Effects of the Invention

The present invention achieves the following outstanding effects.
(1) The opening area S2 between the third valve section and the third valve seat surface in the control area to control the flow rate or pressure in the working control chamber is set smaller than the area S1 of the auxiliary communicating passage, so that the displacement control valve, which is provided with the auxiliary communicating passage to be improved in the function of discharging the liquid refrigerant in the control chamber at the time of startup of the variable displacement compressor, can reduce the minimum area of the Pc-Ps flow path in the control area, and can achieve a reduction in startup time and an improvement in operating efficiency during control of the variable displacement compressor simultaneously.
(2) The maximum opening area S2max between the third valve section and the third valve seat surface with the second valve section in the closed state is set equal to or substantially equal to the area S1 of the auxiliary communicating passage, so that the minimum area of the Pc-Ps flow path at the time of liquid refrigerant discharge can be made as large as that in the above-described conventional art.
(3) In the course of travel of the valve element from the closed state of the second valve section to the closed state of the third valve section, production of the opening area S2 between the third valve section and the third valve seat surface changes from production by the travel direction gap in the travel direction of the valve element to production by the radial gap in the radial direction that is at right angles to the travel direction of the valve element, and the radial gap is set smaller than the area S1 of the auxiliary communicating passage, so that the minimum area of the Pc-Ps flow path can be decreased rapidly from an early stage (a stage where the stroke of the valve element is small) in the control area, and can be maintained at small values until a late stage (a stage where the stroke of the valve element is large) in the control area. Thus, operating efficiency can be improved over the entire range of the control area.
(4) The third valve seat surface is formed in a stepped shape including the large-diameter portion extending on the second valve chest side in the travel direction of the valve element, the valve seat extending continuously from the large-diameter portion in a direction that is at substantially right angles to the travel direction of the valve element, and the small-diameter portion extending continuously from the valve seat toward the proximal end, and the third valve section opposite the third valve seat surface has the opposing surface portion that is opposite the large-diameter portion and is smaller in diameter than the large-diameter portion and larger in diameter than the small-diameter portion, and the contact portion that can be brought into contact with the valve seat, so that the simple configuration can make the minimum area of the Pc-Ps flow path at the time of liquid refrigerant discharge as large as that in the above-described conventional art, and can reduce the minimum area of the Pc-Ps flow path in the control area, thus enabling provision of the displacement control valve that can achieve a reduction in startup time and an improvement in operating efficiency during control of the variable displacement compressor simultaneously.
(5) The third valve seat surface is formed in a cylindrical shape having the inner-diameter surface portion, the outer-diameter surface portion, and the valve seat extending in a direction that is at right angles to the travel direction of the valve element, and the third valve section opposite the third valve seat surface is formed in a stepped shape including the outer-diameter surface portion larger in diameter than the inner-diameter surface portion, the contact portion that extends continuously from the outer-diameter surface portion in a radially inward direction that is a direction at substantially right angles to the travel direction of the valve element, and can be brought into contact with the valve seat, the inclined portion that extends continuously from the contact portion, is smaller in diameter than the inner-diameter surface portion, and is inclined radially inwardly away from the second valve section, and the step extending continuously from the inclined portion in a radially inward direction that is a direction at substantially right angles to the travel direction of the valve element, so that the simple configuration can make the minimum area of the Pc-Ps flow path at the time of liquid refrigerant discharge as large as that in the above-described conventional art, and can reduce the minimum area of the Pc-Ps flow path in the control area, thus enabling provision of the displacement control valve that can achieve a reduction in startup time and an improvement in operating efficiency during control of the variable displacement compressor simultaneously.

DESCRIPTION OF EMBODIMENTS

Hereinafter with reference to the drawings, a mode for carrying out the present invention will be described illustratively based on embodiments. However, the dimensions, materials, shapes, relative positions, and others of components described in the embodiments are not intended to limit the present invention only to them unless otherwise explicitly described.

First Embodiment

Figure 1:
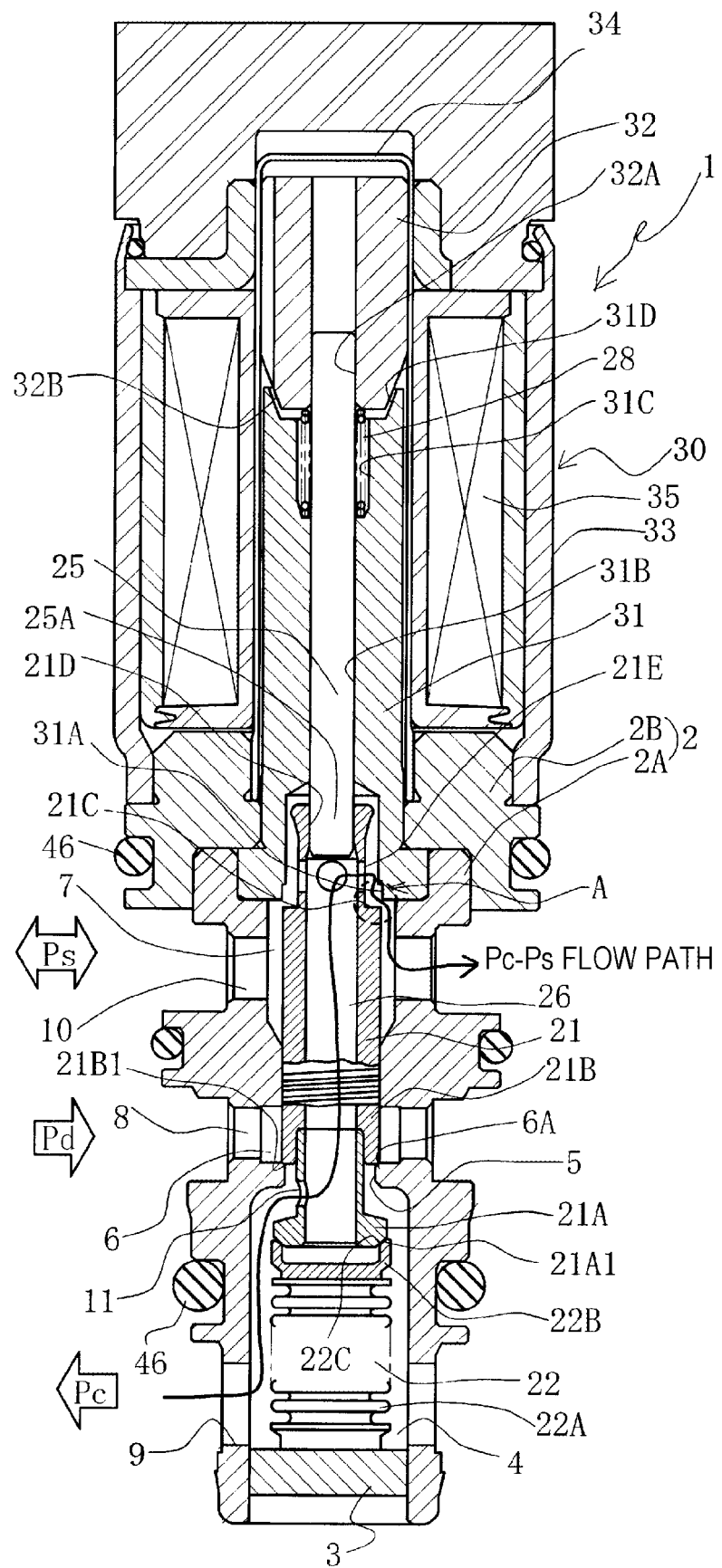
FIG. 1 is a front cross-sectional view showing a displacement control valve according to a first embodiment of the present invention.
Figure 2:
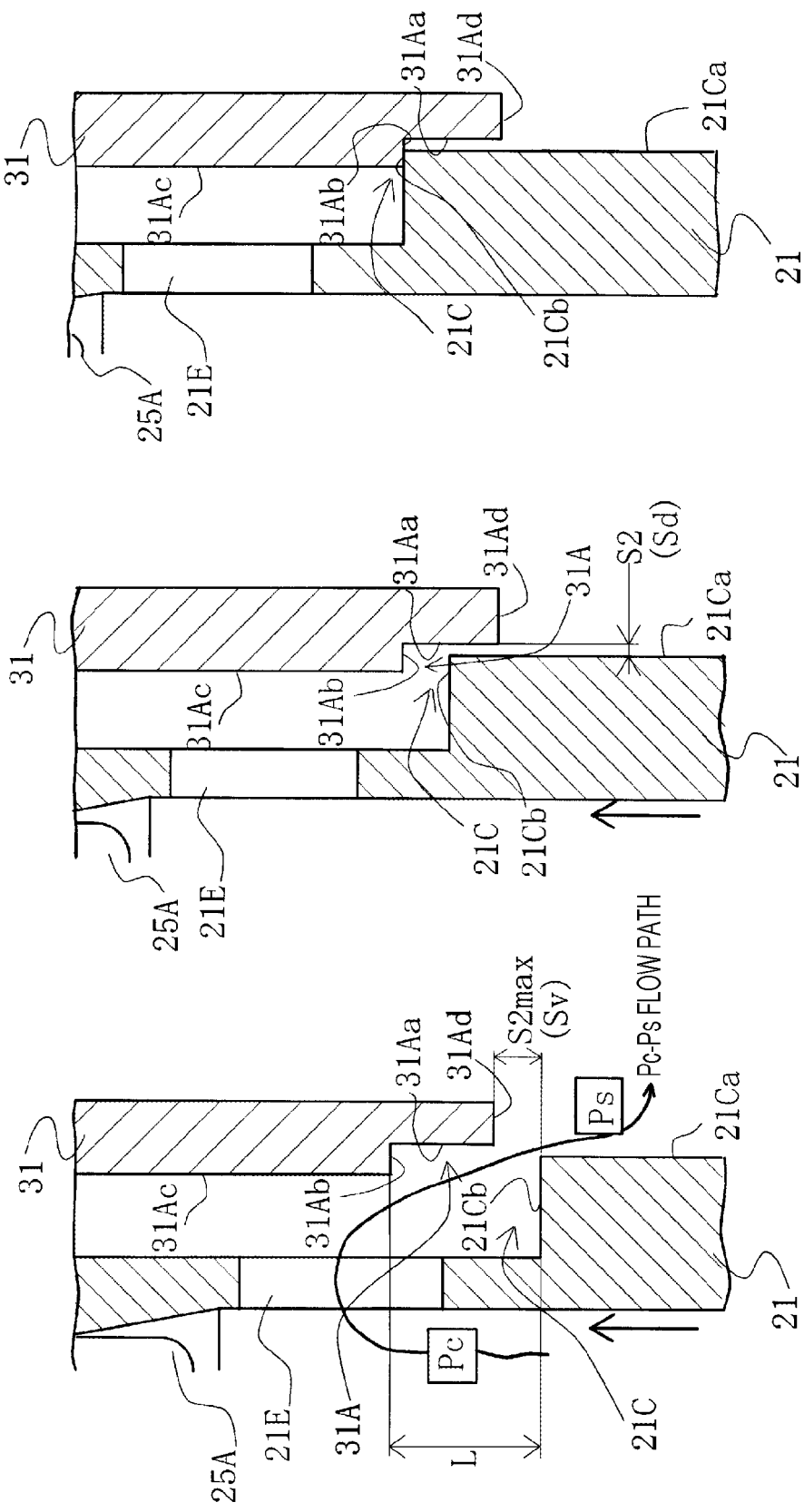
FIGS. 2A to 2C are enlarged views of a portion A in FIG. 1, and are explanatory diagrams for explaining an opening area S2 between a third valve section and a third valve seat surface in different states.
Figure 3:
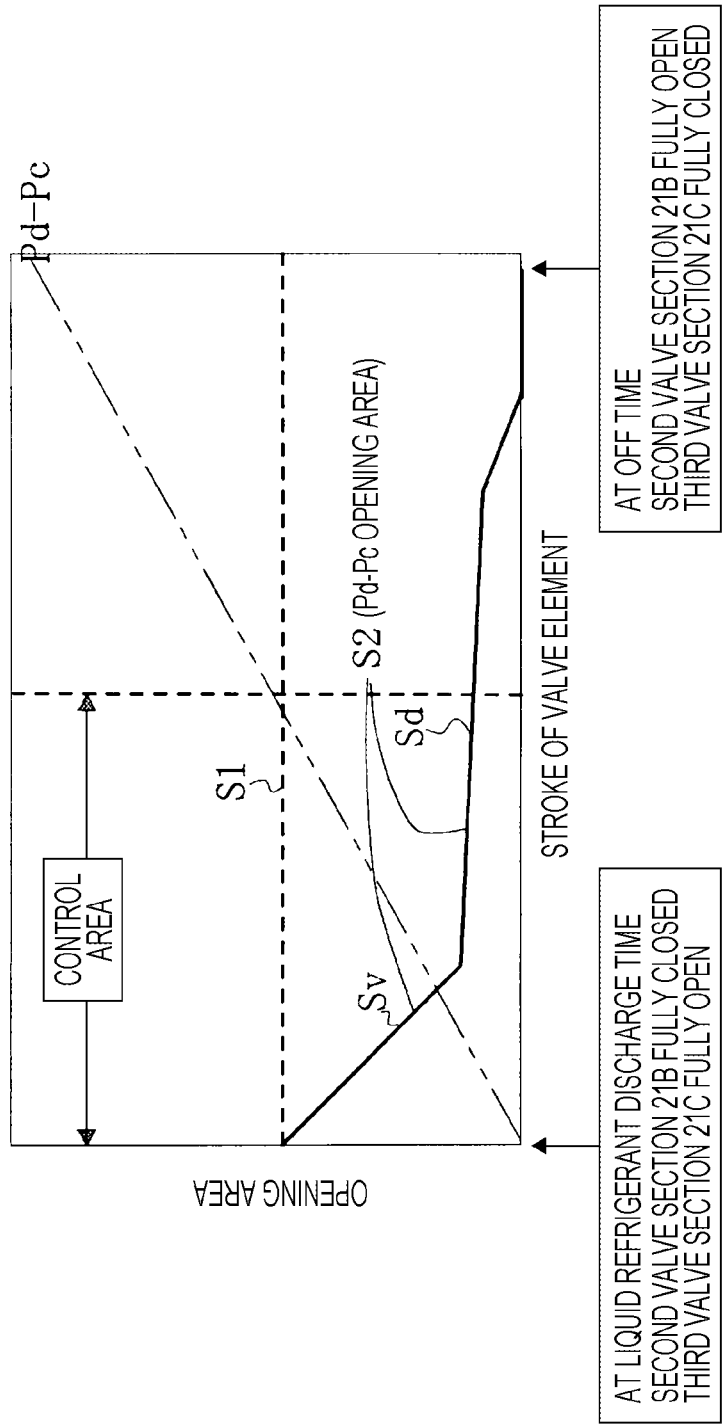
FIG. 3 is an explanatory diagram for explaining the relationship between the opening area S2 between the third valve section and the third valve seat surface and an area S1 of an auxiliary communicating passage in the displacement control valve according to the first embodiment.

With reference to FIGS. 1 to 3, a displacement control valve according to a first embodiment of the present invention will be described.

In FIG. 1, reference numeral 1 denotes a displacement control valve. The displacement control valve 1 is provided with a valve body 2 forming an outside shape. The valve body 2 includes a first valve body 2A having a through hole provided with functions inside, and a second valve body 2B integrally fitted to one end of the first valve body 2A. The first valve body 2A is made of a metal such as brass, iron, aluminum, or stainless, or a synthetic resin material, or the like. The second valve body 2B is formed of a magnetic substance such as iron.

The second valve body 2B is provided separately to be different in function from the material of the first valve body 2A because a solenoid unit 30 is connected to the second valve body 2B, and the second valve body 2B must be of a magnetic substance. If this point is considered, the shape shown in FIG. 1 may be changed appropriately. A partition adjuster 3 is connected to the first valve body 2A at the other end of the through hole. The partition adjuster 3 is fitted to close a first valve chest (hereinafter, sometimes referred to as a displacement chamber) 4 of the first valve body 2A. If screwed in and fixed with a setscrew not shown, the partition adjuster 3 can axially move and adjust the spring force of a compression spring disposed in parallel in a bellows 22A or the bellows 22A.

In a compartment of the through hole axially extending through the first valve body 2A, the displacement chamber 4 is formed on the one-end side. Further, in the through hole, a valve hole 5 having a diameter smaller than the diameter of the displacement chamber 4 is provided consecutively in communication with the displacement chamber 4. Furthermore, in the compartment of the through hole, a second valve chest 6 larger in diameter than the valve hole 5 is provided in communication with the valve hole 5. Moreover, in the compartment of the through hole, a third valve chest 7 is provided consecutively in communication with the second valve chest 6. A second valve seat surface 6A is formed around the valve hole 5 in the second valve chest 6.

Second communicating passages 8 are formed at the second valve chest 6 in the valve body 2. The second communicating passages 8 are configured to communicate with the interior of a discharge chamber of the variable displacement compressor (not shown) so that the displacement control valve 1 allows fluid at a discharge pressure Pd to flow into a control chamber. Further, third communicating passages 10 are formed at the third valve chest 7 in the valve body 2. The third communicating passages 10 are configured to communicate with a suction chamber of the variable displacement compressor so that the displacement control valve 1 allows fluid at a suction pressure Ps to flow into and flow out of the suction chamber.

Further, first communicating passages 9 that allow fluid at the discharge pressure Pd flowing in from the second valve chest 6 to flow out to the control chamber (crank chamber) of the variable displacement compressor are formed at the displacement chamber 4. The first communicating passages 9, the second communicating passages 8, and the third communicating passages 10 are, respectively, two to six in number, for example, and are spaced evenly around a peripheral surface of the valve body 2, extending therethrough. Further, an outer peripheral surface of the valve body 2 is formed into a four-step surface. The outer peripheral surface is provided with O-ring fitting grooves at three locations in the axial direction. In each fitting groove, an O-ring 46 is fitted to seal a space between the valve body 2 and a fitting hole of a casing (not shown) into which the valve body 2 is fitted.

A first valve section 21A that opens and closes with a first valve seat surface 22C of a valve seat 22B is provided at one end of the valve element 21. The first valve section 21A is provided with a first valve section surface 21A1 that opens and closes with the first valve seat surface 22C. Further, the opposite end of the first valve section 21A to the first valve section surface 21A1 is integrally fitted in a mounting hole of a second valve section 21B as a connecting portion. An axially extending intermediate communicating passage 26 is formed through the interior of the first valve section 21A. Although the valve element 21 and the first valve section 21A connected thereto, which are fitted to each other on opposite sides of the valve hole 5 of the valve body 2, are provided separately for the sake of fitting, the two components may be formed integrally as necessary. The outer diameter of the connecting portion of the first valve section 21A is made smaller than the diameter of the valve hole 5 to form a circulation passage extending through the valve hole 5 so that fluid at the discharge pressure Pd can pass between the valve hole 5 and the connecting portion when the second valve section 21B is open.

An auxiliary communicating passage 11 extends through a side surface of the first valve section 21A into the intermediate communicating passage 26. The diameter of the auxiliary communicating passage 11 is made in a range of 0.5 mm to 2.5 mm. Preferably, the diameter of the auxiliary communicating passage 11 is 0.8 mm to 2.0 mm.

Instead of being provided in the side surface of the first valve section 21A, the auxiliary communicating passage 11 may be provided in a side surface of the valve seat 22B described later.

A pressure-sensitive element (hereinafter, referred to as a pressure-sensitive device) 22 is provided in the displacement chamber 4. The pressure-sensitive device 22 includes the metal bellows 22A connected at one end to the partition adjuster 3 in a sealed state and connected at the other end to the valve seat 22B. The bellows 22A is made of phosphor bronze or the like, and its spring constant is designed to a predetermined value. The interior space of the pressure-sensitive device 22 is a vacuum or contains air. The pressure-sensitive device 22 is configured such that the pressure in the displacement chamber 4 (e.g. pressure Pc) and the suction pressure Ps act on an effective pressure-receiving area Ab of the bellows 22A to contract the pressure-sensitive device 22. The dish-shaped valve seat 22B provided with the first valve seat surface 22C at an edge peripheral surface is provided at a free end of the pressure-sensitive device 22.

Depending on the capacity of the air conditioner, the diameter of the auxiliary communicating passage 11 may vary.

In a state where the pressure-sensitive device 22 is contracted according to the pressure of the control fluid Pc of a vaporized refrigerant liquid, opening the first valve section 21A, time taken to vaporize the refrigerant liquid is as long as ten minutes or longer. During this, the pressure in the control chamber of the swash-plate variable displacement compressor is in a vaporizing state and therefore gradually increases, thus resulting in a further delay in vaporization. However, the provision of the auxiliary communicating passage 11 allows the refrigerant liquid in the control chamber to be rapidly vaporized. When all the refrigerant liquid in the control chamber is vaporized, the displacement control valve 1 can freely control the pressure in the control chamber.

The second valve section 21B at an intermediate portion of the valve element 21 is disposed in the second valve chest 6. The second valve section 21B is provided with a second valve section surface 21B1 that is joined to the second valve seat surface 6A.

The second valve section surface 21B1 is configured to have a sealing pressure-receiving area that is equal to or substantially equal to the effective pressure-receiving area of the pressure-sensitive device 22.

A third valve section 21C on the upper side of the valve element 21 is disposed in the third valve chest 7. The third valve section 21C opens and closes with a third valve seat surface 31A formed at a lower end surface of a fixed iron core 31.

In the interior of the valve element 21, the intermediate communicating passage 26 extends from the first valve chest 4 to the third valve chest 7. When the third valve section 21C opens from the third valve seat surface 31A, the control fluid Pc can flow out from the first valve chest 4 into the third communicating passages 10. In the valve element 21, a connecting portion 25A provided at a lower end portion of a solenoid rod 25 is fitted into a fitting hole 21D of the valve element 21. The valve element 21 is provided with, for example, four evenly-spaced circulation holes 21E located below the fitting hole 21D in the third valve chest 7. Through the circulation holes 21E, the third valve chest 7 communicates with the intermediate communicating passage 26. The third valve chest 7 has a surface with a diameter slightly larger than that of the outer shape of the valve element 21 to facilitate flowing of fluid at the suction pressure Ps from the third communicating passages 10 into the third valve chest 7. The above-described configuration of a lower part in FIG. 1 including the valve body 2, the valve element 21, and the pressure-sensitive device 22 constitutes a valve unit.

The other end portion of the solenoid rod 25 opposite the connecting portion 25A is fitted into a fitting hole 32A of a plunger 32 for connection. The fixed iron core 31 fixed to the first valve body 2A is provided between the valve element 21 and the plunger 32. The solenoid rod 25 is fitted movably along an inner peripheral surface 31B of the fixed iron core 31.

A spring seat chamber 31C is formed in the fixed iron core 31 on the side of the plunger 32. Spring means (hereinafter, also referred to as resilient means) 28 for bringing the first valve section 21A and the second valve section 21B from a closed state into an open state is disposed in the spring seat chamber 31C. That is, the spring means 28 springs to separate the plunger 32 from the fixed iron core 31. An attraction surface 31D of the fixed iron core 31 and a joint surface 32B of the plunger 32 form opposing tapered surfaces, providing a gap between the opposing surfaces to enable attraction. The separation and contact between the attraction surface 31D of the fixed iron core 31 and the joint surface 32B of the plunger 32 depend on the strength of a current flowing through an electromagnetic coil 35. A solenoid case 33 is fixed to a step on the one-end side of the second valve body 2B. In the solenoid case 33, the electromagnetic coil 35 is disposed. The solenoid unit 30 presents the above overall configuration. The electromagnetic coil 35 provided in the solenoid unit 30 is controlled by a control computer (not shown).

A plunger case 34 is fitted to the fixed iron core 31. The plunger 32 is slidably fitted therein. The plunger case 34 is fitted at one end in a fitting hole of the second valve body 2B, and is fixed at the other end in a fitting hole in an end portion of the solenoid case 33. The above configuration constitutes the solenoid unit 30.

In FIG. 1, a thick curved line of an arrow from one of the first communicating passages 9 to one of the third communicating passages 10 indicates a Pc-Ps flow path.

Next, with reference to FIG. 2, the positional relationship between the third valve section 21C and the third valve seat surface 31A will be described in detail.

In FIGS. 2A to 2C, the third valve seat surface 31A is formed in a stepped shape including a large-diameter portion 31Aa extending on the side of the second valve chest 6 in a travel direction of the valve element 21, a valve seat 31Ab that extends continuously from the large-diameter portion 31Aa in a direction at substantially right angles to the travel direction of the valve element 21, and a small-diameter portion 31Ac that extends continuously from the valve seat 31Ab toward a proximal end of the fixed iron core 31.

The third valve section 21C opposite the third valve seat surface 31A has an opposing surface portion 21Ca that is opposite the large-diameter portion 31Aa of the third valve seat surface 31A and is smaller in diameter than the large-diameter portion 31Aa and larger in diameter than the small-diameter portion 31Ac of the third valve seat surface 31A, and a contact portion 21Cb that can be brought into contact with the valve seat 31Ab.

At the time of liquid refrigerant discharge shown in FIG. 2A, that is, in a state where the second valve section 21B is fully closed (the third valve section 21C is fully open), the distance L between the contact portion 21Cb of the third valve section 21C and the valve seat 31Ab of the third valve seat surface 31A represents the stroke of the valve element 21. In this state where the second valve section 21B is closed, a travel direction gap Sv between the contact portion 21Cb of the third valve section 21C and a distal end 31Ad of the third valve seat surface 31A produces the maximum opening area S2max. The position of the distal end 31Ad of the third valve seat surface 31A is set such that the maximum opening area S2max is equal to or substantially equal to an area S1 of the auxiliary communicating passage 11. In this case, the travel direction gap Sv changes rapidly with the travel of the valve element.

A thick curved line of an arrow indicates the Pc-Ps flow path.

In a control area shown in FIG. 2B, in the course of travel of the valve element 21 from the closed state of the second valve section 21B to the closed state of the third valve section 21C, the production of the opening area S2 between the third valve section 21C and the third valve seat surface 31A changes from production by the travel direction gap Sv in the travel direction of the valve element 21 to production by a radial gap Sd in a radial direction that is at right angles to the travel direction of the valve element 21. The radial gap Sd is set to a value smaller than the area S1 of the auxiliary communicating passage 11, for example, 10% to 30% of S1. The radial gap Sd has a substantially fixed value, irrespective of the travel of the valve element 21.

At an OFF time when the second valve section 21B is in a fully-open (the third valve section 21C is in a fully-closed) state shown in FIG. 2C, the contact portion 21Cb of the third valve section 21C is brought into contact with the valve seat 31Ab of the third valve seat surface 31A, and the opening area S2 becomes zero.

Next, with reference to FIG. 3, the minimum area of the Pc-Ps flow path will be described.

In FIG. 3, the horizontal axis represents the stroke of the valve element 21, and the vertical axis the opening area.

The left end in FIG. 3 indicates the time of liquid refrigerant discharge, that is, a state where the second valve section 21B is fully closed (the third valve section 21C is fully open). Likewise, the right end indicates a state where the second valve section 21B is fully open (the third valve section 21C is fully closed). A range from the left end to a vertical line formed of a broken line in a substantially midpoint position on the horizontal axis represents the control area.

A horizontal line formed of a broken line in a substantially midpoint position on the vertical axis represents the area S1 of the auxiliary communicating passage 11.

In the present invention, since the opening area S2 between the third valve section 21C and the third valve seat surface 31A in the control area is set smaller than the (fixed) area S1 of the auxiliary communicating passage 11, the minimum area of the Pc-Ps flow path is defined by the opening area S2 between the third valve section 21C and the third valve seat surface 31A.

In FIG. 3, the opening area S2 between the third valve section 21C and the third valve seat surface 31A in the control area is shown by a solid line. At the time of liquid refrigerant discharge at the left end, that is, in the state where the second valve section 21B is fully closed (the third valve section 21C is fully open), the travel direction gap Sv produces the maximum opening area S2max, and the maximum opening area S2max is set equal to or substantially equal to the area S1 of the auxiliary communicating passage 11. As the valve element 21 starts to travel, first, the opening area S2 is rapidly decreased from the area S1 of the auxiliary communicating passage 11. This is because the opening area S2 is produced by the travel direction gap Sv shown in FIG. 2A, and the travel direction gap Sv is rapidly decreased with the travel of the valve element 21.

Then, the opening area S2 has a value smaller than the area S1 of the auxiliary communicating passage 11 since the production thereof changes from the production by the travel direction gap Sv in the travel direction of the valve element 21 to the production by the radial gap Sd in the radial direction that is at right angles to the travel direction of the valve element 21 in the course of travel of the valve element 21 from the closed state of the second valve section 21B to the closed state of the third valve section 21C. In the case of FIG. 3, the radial gap Sd is set to a value of about 20% of the area S1 of the auxiliary communicating passage 11.

The displacement control valve according to the first embodiment of the present invention is as described above, and achieves the following outstanding effects.

(1) The opening area S2 between the third valve section 21C and the third valve seat surface 31A in the control area to control the flow rate or pressure in the working control chamber is set smaller than the area S1 of the auxiliary communicating passage 11, so that the displacement control valve, which is provided with the auxiliary communicating passage to be improved in the function of discharging the liquid refrigerant in the control chamber at the time of startup of the variable displacement compressor, can reduce the minimum area of the Pc-Ps flow path in the control area, and can thus achieve a reduction in startup time and an improvement in operating efficiency during control of the variable displacement compressor simultaneously.

(2) The maximum opening area S2max between the third valve section 21C and the third valve seat surface 31A when the second valve section 21B is in the closed state is set equal to or substantially equal to the area S1 of the auxiliary communicating passage 11, so that the minimum area of the Pc-Ps flow path at the time of liquid refrigerant discharge can be made as large as that in the above-described conventional art.

(3) In the course of travel of the valve element 21 from the closed state of the second valve section 21B to the closed state of the third valve section 21C, the production of the opening area S2 between the third valve section 21C and the third valve seat surface 31A changes from the production by the travel direction gap Sv in the travel direction of the valve element 21 to the production by the radial gap Sd in the radial direction that is at right angles to the travel direction of the valve element 21, and the radial gap Sd is set smaller than the area S1 of the auxiliary communicating passage 11, so that the minimum area of the Pc-Ps flow path can be decreased rapidly from an early stage (a stage where the stroke of the valve element 21 is small) in the control area, and can be maintained at small values until a late stage (a stage where the stroke of the valve element 21 is large) in the control area. Thus, operating efficiency can be improved over the entire range of the control area.

(4) The third valve seat surface 31A is formed in a stepped shape including the large-diameter portion 31Aa extending on the side of the second valve chest 6 in the travel direction of the valve element 21, the valve seat 31Ab extending continuously from the large-diameter portion 31Aa in a direction that is at substantially right angles to the travel direction of the valve element 21, and the small-diameter portion 31Ac extending continuously from the valve seat 31Ab toward the proximal end, and the third valve section 21C opposite the third valve seat surface 31A has the opposing surface portion 21Ca that is opposite the large-diameter portion 31Aa and is smaller in diameter than the large-diameter portion 31Aa and larger in diameter than the small-diameter portion 31Ac, and the contact portion 21Cb that can be brought into contact with the valve seat 31Ab, so that the simple configuration can make the minimum area of the Pc-Ps flow path at the time of liquid refrigerant discharge as large as that in the above-described conventional art, and can reduce the minimum area of the Pc-Ps flow path in the control area, thus enabling provision of the displacement control valve that can achieve a reduction in startup time and an improvement in operating efficiency during control of the variable displacement compressor simultaneously.

Second Embodiment

Figure 4:
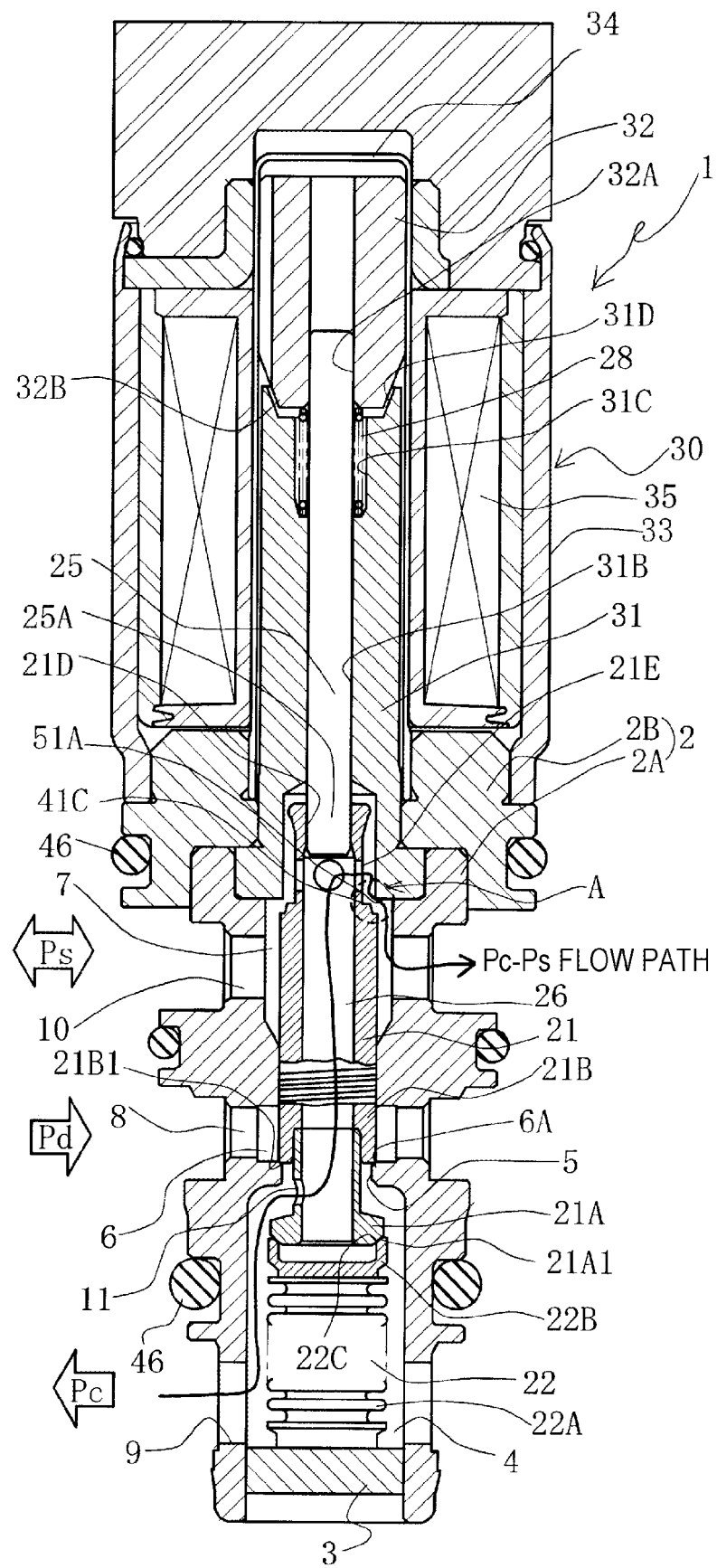
FIG. 4 is a front cross-sectional view showing a displacement control valve according to a second embodiment of the present invention.
Figure 5:
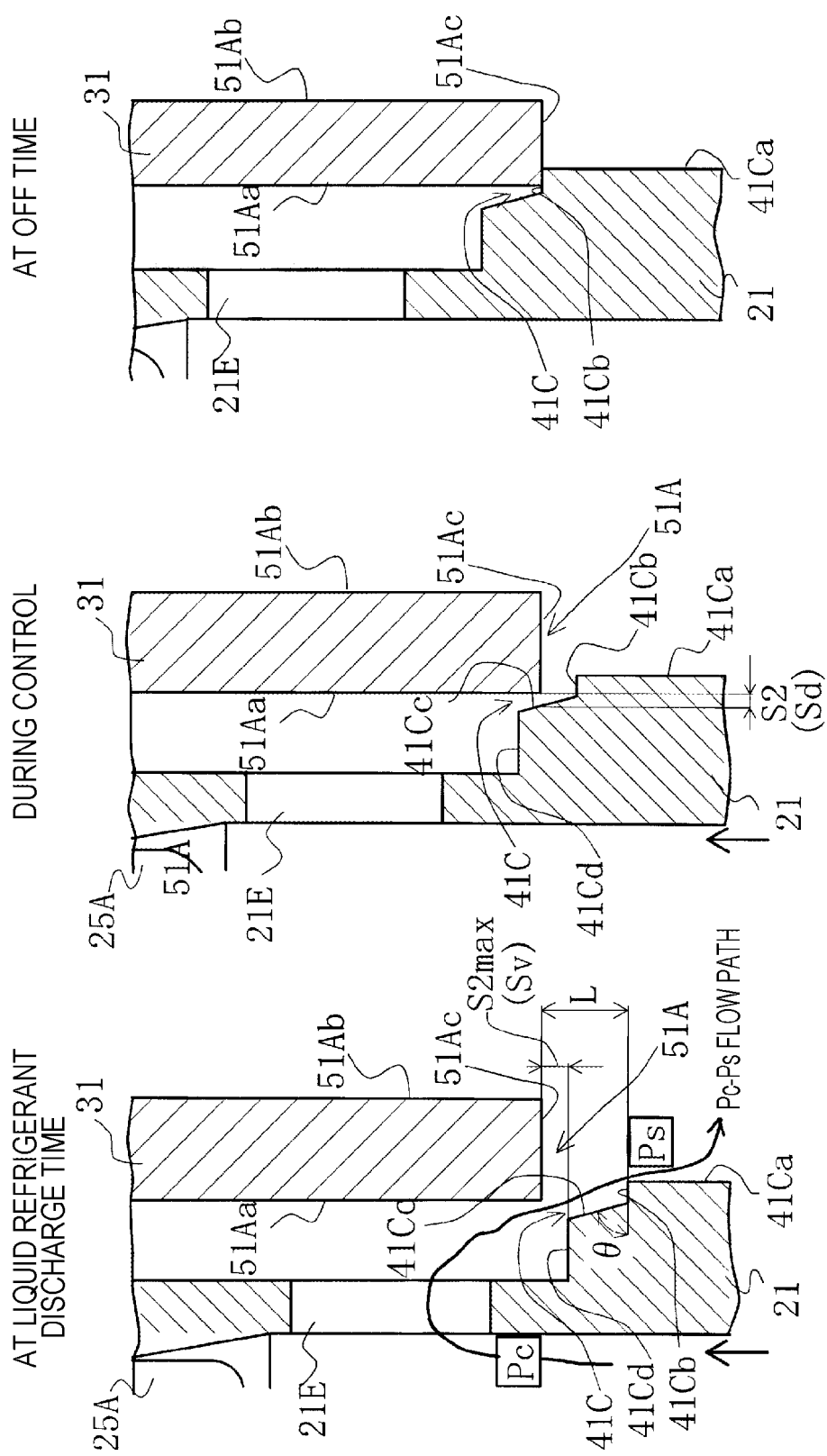
FIGS. 5A to 5C are enlarged views of a portion A in FIG. 4, and are explanatory diagrams for explaining an opening area S2 between a third valve section and a third valve seat surface in different states.
Figure 6:
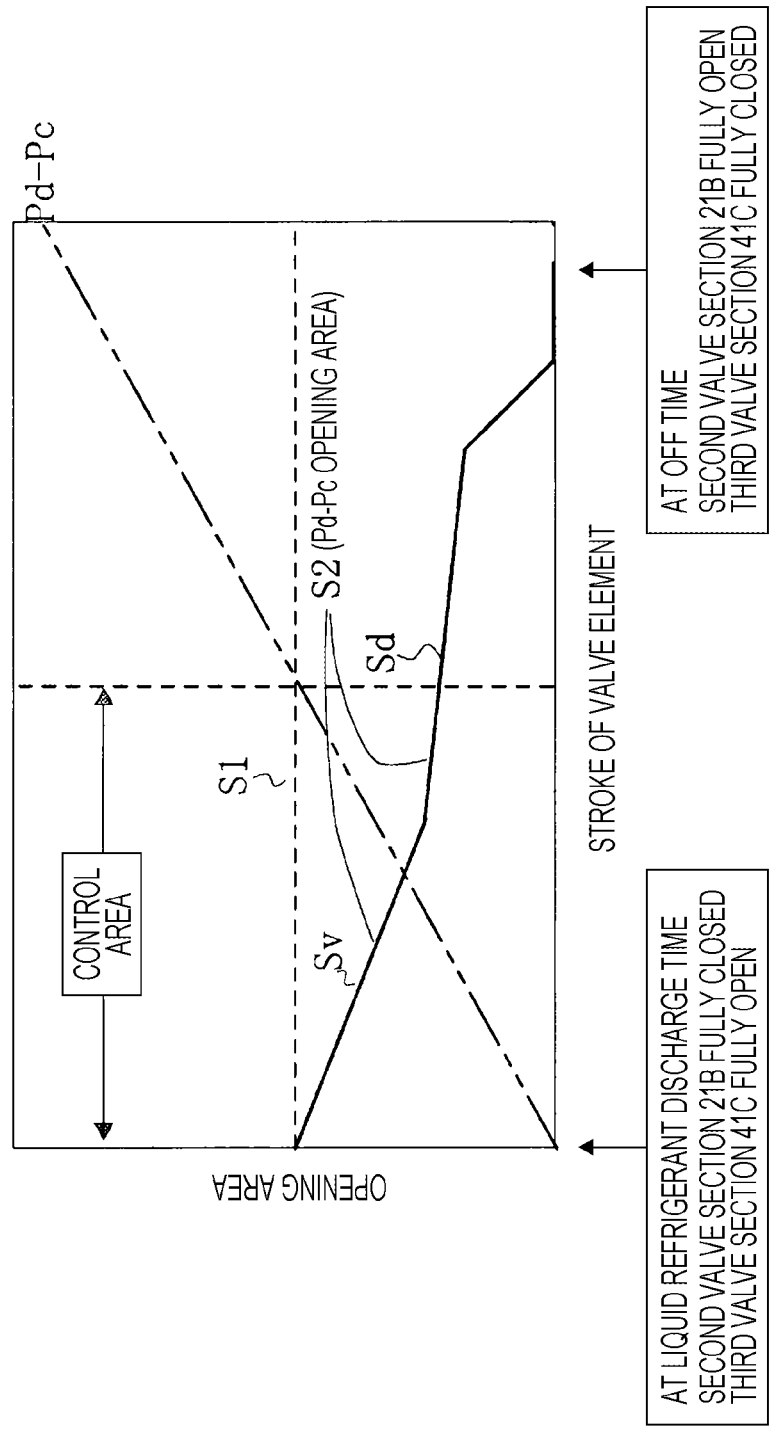
FIG. 6 is an explanatory diagram for explaining the relationship between an opening area S2 between the third valve section and the third valve seat surface and an area S1 of an auxiliary communicating passage in the displacement control valve according to the second embodiment.
Figure 7:
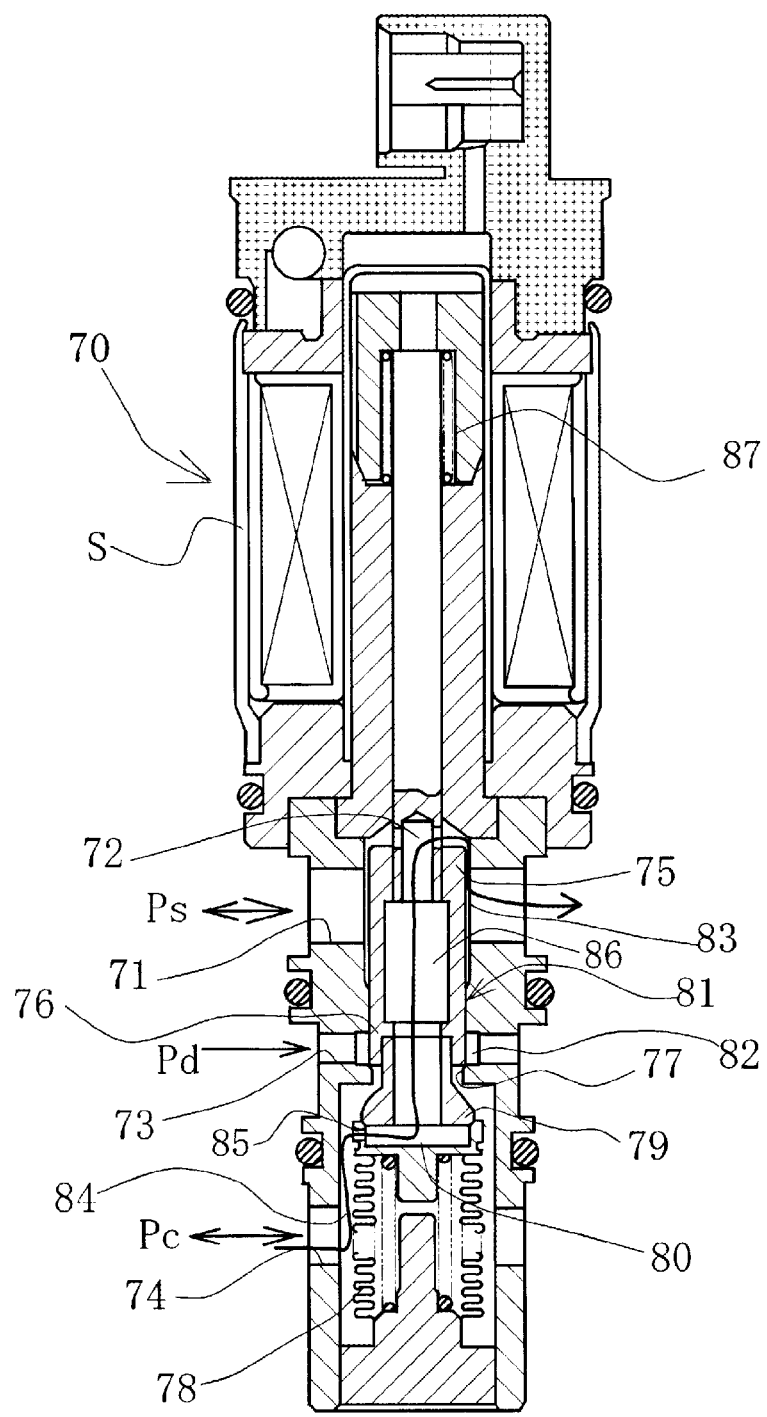
FIG. 7 is a front cross-sectional view showing the displacement control valve in the conventional art.
Figure 8:
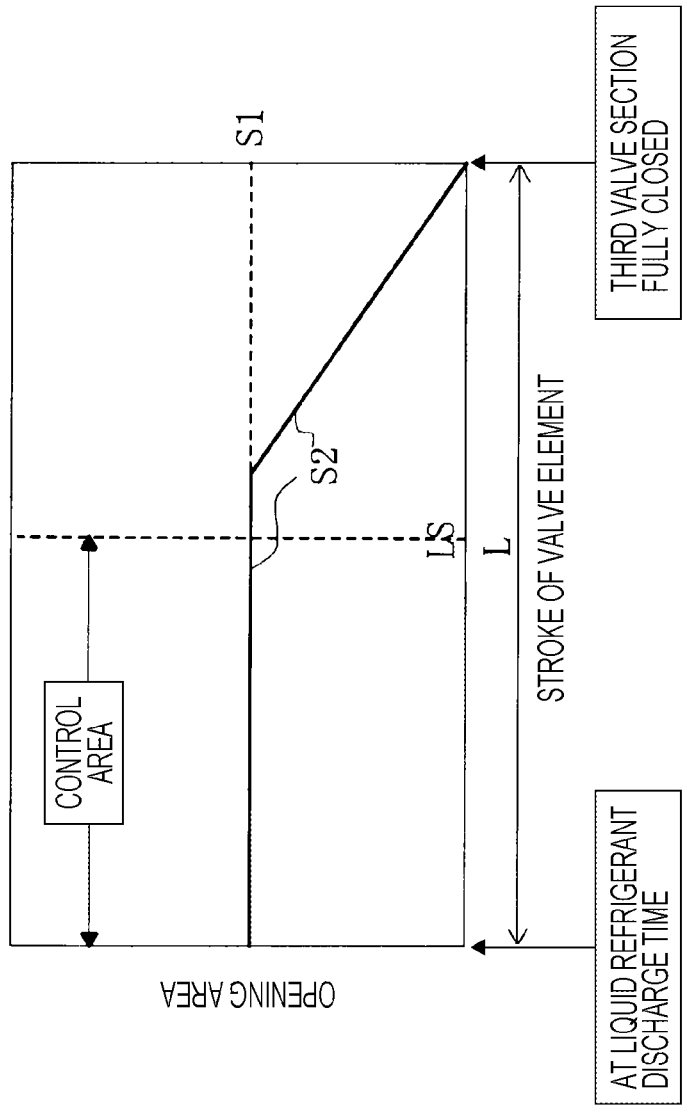
FIG. 8 is an explanatory graph diagram for explaining the relationship between an opening area S2 between the third valve section and the third valve seat surface and an area S1 of the auxiliary communicating passage in the displacement control valve according to the conventional art.

With reference to FIGS. 4 to 6, a displacement control valve according to a second embodiment of the present invention will be described.

The displacement control valve according to the second embodiment includes a third valve section 41C and a third valve seat surface 51A that are different in shape from the third valve section 21C and the third valve seat surface 31A of the displacement control valve according to the first embodiment, but is identical to that of the first embodiment in the other basic configuration. The same reference numerals and letters are assigned to the same members without duplicated explanation.

In FIGS. 5A to 5C, the third valve seat surface 51A has a cylindrical shape including an inner-diameter surface portion 51Aa, an outer-diameter surface portion 51Ab, and a valve seat 51Ac extending in a direction that is at right angles to the travel direction of the valve element 21.

The third valve section 41C opposite the third valve seat surface 51A is formed in a stepped shape including an outer-diameter surface portion 41Ca larger in diameter than the inner-diameter surface portion 51Aa of the third valve seat surface 51A, a contact portion 41Cb extending continuously from the outer-diameter surface portion 41Ca in a radially inward direction that is a direction at substantially right angles to the travel direction of the valve element 21, and can be brought into contact with the valve seat 51Ac, an inclined portion 41Cc that extends continuously from the contact portion 41Cb, is smaller in diameter than the inner-diameter surface portion 51Aa of the third valve seat surface 51A, and is inclined radially inwardly away from the second valve section 21B, and a step 41Cd extending continuously from the inclined portion 41Cc in an radially inward direction that is a direction at substantially right angles to the travel direction of the valve element 21.

At the time of liquid refrigerant discharge shown in FIG. 5A, that is, in a state where the second valve section 21B is fully closed (the third valve section 41C is fully open), the distance L between the contact portion 41Cb of the third valve section 41C and the valve seat 51Ac of the third valve seat surface 51A represents the stroke of the valve element 21. In this state where the second valve section 21B is closed, the travel direction gap Sv between the step 41Cd of the third valve section 41C and the valve seat 51Ac of the third valve seat surface 51A produces the maximum opening area S2max. The position of the step 41Cd of the third valve section 41C is set such that the maximum opening area S2max is equal to or substantially equal to the area S1 of the auxiliary communicating passage 11. The travel direction gap Sv changes rapidly with the travel of the valve element.

A thick curved line of an arrow indicates the Pc-Ps flow path.

In a control area shown in FIG. 5B, in the course of travel of the valve element 21 from the closed state of the second valve section 21B to the closed state of the third valve section 41C, the production of the opening area S2 between the third valve section 41C and the third valve seat surface 51A changes from production by the travel direction gap Sv in the travel direction of the valve element 21 to production by a radial gap Sd in a radial direction that is at right angles to the travel direction of the valve element 21. In the case of the second embodiment, the inclined portion 41Cc is included, and thus the radial gap Sd changes with the travel of the valve element.

The radial gap Sd is set smaller than the area S1 of the auxiliary communicating passage 11, for example, in a range of 10% to 30% of S1. An inclination angle θ of the inclined portion 41Cc is set such that the radial gap Sd gradually decreases with the upward travel of the valve element 21. The inclination angle θ is preferably set in a range of 60° to 90°. When the inclination angle θ is 90°, the second embodiment has the same characteristics as the first embodiment, and when the inclination angle θ is 0°, the second embodiment has the same characteristics as the above-described conventional art. In the case of FIG. 5, the inclination angle θ is about 80°.

At an OFF time when the second valve section 21B is in a fully-open (the third valve section 41C is in a fully-closed) state shown in FIG. 5C, the contact portion 41Cb of the third valve section 41C is brought into contact with the valve seat 51Ac of the third valve seat surface 51A, and the opening area S2 becomes zero.

Next, with reference to FIG. 6, the minimum area of the Pc-Ps flow path will be described.

In FIG. 6, the horizontal axis represents the stroke of the valve element 21, and the vertical axis the opening area.

The left end in FIG. 6 indicates the time of liquid refrigerant discharge, that is, a state where the second valve section 21B is fully closed (the third valve section 41C is fully open). Likewise, the right end indicates a state where the second valve section 21B is fully open (the third valve section 41C is fully closed). A range from the left end to a vertical line formed of a broken line in a substantially midpoint position on the horizontal axis represents the control area.

A horizontal line formed of a broken line in a substantially midpoint position on the vertical axis represents the area S1 of the auxiliary communicating passage 11.

In the present invention, since the opening area S2 between the third valve section 41C and the third valve seat surface 51A in the control area is set smaller than the (fixed) area S1 of the auxiliary communicating passage 11, the minimum area of the Pc-Ps flow path is defined by the opening area S2 between the third valve section 41C and the third valve seat surface 51A.

In FIG. 6, the opening area S2 between the third valve section 41C and the third valve seat surface 51A in the control area is shown by a solid line. At the time of liquid refrigerant discharge at the left end, that is, in the state where the second valve section 21B is fully closed (the third valve section 41C is fully open), the travel direction gap Sv produces the maximum opening area S2max, and the maximum opening area S2max is set equal to or substantially equal to the area S1 of the auxiliary communicating passage 11. Thus, as the valve element 21 starts to travel, first, the opening area S2 is rapidly decreased from the area S1 of the auxiliary communicating passage 11. This rapid decrease of the opening area S2 is because the travel direction gap Sv shown in FIG. 5A is decreased rapidly with the travel of the valve element 21.

Then, the opening area S2 is gradually decreased since the production thereof changes from the production by the travel direction gap Sv in the travel direction of the valve element 21 to the production by the radial gap Sd in the radial direction that is at right angles to the travel direction of the valve element 21 in the course of travel of the valve element 21 from the closed state of the second valve section 21B to the closed state of the third valve section 41C, and in a late stage (a stage where the stroke of the valve element 21 is large) in the control area, has a value smaller than the area S1 of the auxiliary communicating passage 11. In the case of FIG. 6, the radial gap Sd is set in a range of 40% to 60% of the area S1 of the auxiliary communicating passage 11.

The displacement control valve according to the second embodiment of the present invention has the above configuration, and achieves the following outstanding effects.

(1) The opening area S2 between the third valve section 41C and the third valve seat surface 51A in the control area to control the flow rate or pressure in the working control chamber is set smaller than the area S1 of the auxiliary communicating passage 11, so that the displacement control valve, which is provided with the auxiliary communicating passage to be improved in the function of discharging the liquid refrigerant in the control chamber at the time of startup of the variable displacement compressor, can reduce the minimum area of the Pc-Ps flow path in the control area, and can achieve a reduction in startup time and an improvement in operating efficiency during control of the variable displacement compressor simultaneously.

(2) The maximum opening area S2max between the third valve section 41C and the third valve seat surface 51A when the second valve section 21B is in the closed state is set equal to or substantially equal to the area S1 of the auxiliary communicating passage 11, so that the minimum area of the Pc-Ps flow path at the time of liquid refrigerant discharge can be made as large as that in the above-described conventional art.

(3) In the course of travel of the valve element 21 from the closed state of the second valve section 21B to the closed state of the third valve section 41C, the production of the opening area S2 between the third valve section 41C and the third valve seat surface 51A changes from the production by the travel direction gap Sv in the travel direction of the valve element 21 to the production by the radial gap Sd in the radial direction that is at right angles to the travel direction of the valve element 21, and the radial gap Sd is set smaller than the area S1 of the auxiliary communicating passage 11, so that the minimum area of the Pc-Ps flow path can be decreased rapidly from an early stage (a stage where the stroke of the valve element 21 is small) in the control area, and can be maintained at small values until a late stage (a stage where the stroke of the valve element 21 is large) in the control area. Thus, operating efficiency can be improved over the entire range of the control area.

(4) The third valve seat surface 51A is formed in a cylindrical shape having the inner-diameter surface portion 51Aa, the outer-diameter surface portion 51Ab, and the valve seat 51Ac extending in a direction that is at right angles to the travel direction of the valve element 21, and the third valve section 41C opposite the third valve seat surface 51A is formed in a stepped shape including the outer-diameter surface portion 41Ca larger in diameter than the inner-diameter surface portion 51Aa, the contact portion 41Cb that extends continuously from the outer-diameter surface portion 41Ca in a radially inward direction that is a direction at substantially right angles to the travel direction of the valve element 21, and can be brought into contact with the valve seat 51Ac, the inclined portion 41Cc that extends continuously from the contact portion 41Cb, is smaller in diameter than the inner-diameter surface portion 51Aa, and is inclined radially inwardly away from the second valve section 21B, and the step 41Cd extending continuously from the inclined portion 41Cc in a radially inward inner-diameter direction that is a direction at substantially right angles to the travel direction of the valve element 21, so that the simple configuration can make the minimum area of the Pc-Ps flow path at the time of liquid refrigerant discharge as large as that in the above-described conventional art, and can reduce the minimum area of the Pc-Ps flow path in the control area, thus enabling provision of the displacement control valve that can achieve a reduction in startup time and an improvement in operating efficiency during control of the variable displacement compressor simultaneously.

Although the mode for carrying out the present invention has been described above using the embodiments, its specific configuration is not limited to these embodiments. Any changes and additions made without departing from the scope of the present invention are included in the present invention.

The invention claimed is:

1. A displacement control valve that controls a flow rate or pressure in a working control chamber according to a degree of opening of a valve unit, comprising:
a valve body including a first valve chest that communicates with first communicating passages for passing fluid at control pressure, a second valve chest that has a second valve seat surface for a valve hole communicating with the first valve chest and communicates with second communicating passages for passing fluid at discharge pressure, and a third valve chest that communicates with third communicating passages for passing fluid at suction pressure and has a third valve seat surface;
a valve element disposed in the valve body and having an intermediate communicating passage communicating with the first valve chest and the third communicating passages, the valve element having a second valve section that separates from and comes into contact with the second valve seat surface to open and close the valve hole communicating with the first valve chest and the second valve chest, a third valve section that opens and closes opposite to, and in conjunction with, the second valve section and separates from and comes into contact with the third valve seat surface to open and close communication between the intermediate communicating passage and the third communicating passages, and a first valve section that is disposed in the first valve chest and opens and closes in the same direction as, and in conjunction with, the second valve section;

a pressure-sensitive element that is disposed in the first valve chest and extends and contracts in response to suction pressure, the pressure-sensitive element having, at an extending and contracting free end thereof, a valve seat that separates from and comes into contact with the first valve section to open and close communication between the first valve chest and the intermediate communicating passage;

an auxiliary communicating passage provided in the first valve section in the first valve chest or in the valve seat for the first valve section, for enabling communication between an interior of the first valve chest and the intermediate communicating passage; and a solenoid unit mounted to the valve body for actuating the valve element in a travel direction to open and close the valve sections of the valve element according to a current, wherein an opening area between the third valve section and the third valve seat surface in a control area to control the flow rate or pressure in the working control chamber is set smaller than an area of the auxiliary communicating passage, and a maximum opening area between the third valve section and the third valve seat surface with the second valve section in a closed state is set equal to or substantially equal to the area of the auxiliary communicating passage.

2. The displacement control valve according to claim 1, wherein in the course of travel of the valve element from a closed state of the second valve section to a closed state of the third valve section, production of the opening area between the third valve section and the third valve seat surface changes from production by a travel direction gap in the travel direction of the valve element to production by a radial gap in a radial direction that is at right angles to the travel direction of the valve element, and the radial gap is set smaller than the area of the auxiliary communicating passage.

3. The displacement control valve according to claim 2, wherein the third valve seat surface is formed in a stepped shape including a large-diameter portion extending on a second valve chest side in the travel direction of the valve element, a valve seat extending continuously from the large-diameter portion in a direction that is at substantially right angles to the travel direction of the valve element, and a small-diameter portion extending continuously from the valve seat toward a proximal end, and the third valve section opposite the third valve seat surface has an opposing surface portion that is opposite the large-diameter portion and is smaller in diameter than the large-diameter portion and larger in diameter than the small-diameter portion, and a contact portion that can be brought into contact with the valve seat.

4. The displacement control valve according to claim 2, wherein the third valve seat surface is formed in a cylindrical shape having an inner-diameter surface portion, an outer-diameter surface portion, and a valve seat extending in a direction that is at right angles to the travel direction of the valve element, and the third valve section opposite the third valve seat surface is formed in a stepped shape including an outer-diameter surface portion larger in diameter than the inner-diameter surface portion, a contact portion that extends continuously from the outer-diameter surface portion of the third valve section in a radially inward direction that is a direction at substantially right angles to the travel direction of the valve element, and can be brought into contact with the valve seat, an inclined portion that extends continuously from the contact portion, is smaller in diameter than the inner-diameter surface portion, and is inclined radially inwardly away from the second valve section, and a step extending continuously from the inclined portion in a radially inward direction that is a direction at substantially right angles to the travel direction of the valve element.

5. The displacement control valve according to claim 1, wherein the third valve seat surface is formed in a stepped shape including a large-diameter portion extending on a second valve chest side in the travel direction of the valve element, a valve seat extending continuously from the large-diameter portion in a direction that is at substantially right angles to the travel direction of the valve element, and a small-diameter portion extending continuously from the valve seat toward a proximal end, and the third valve section opposite the third valve seat surface has an opposing surface portion that is opposite the large-diameter portion and is smaller in diameter than the large-diameter portion and larger in diameter than the small-diameter portion, and a contact portion that can be brought into contact with the valve seat.

6. The displacement control valve according to claim 5, wherein the third valve seat surface is formed in a cylindrical shape having an inner-diameter surface portion, an outer-diameter surface portion, and a valve seat extending in a direction that is at right angles to the travel direction of the valve element, and the third valve section opposite the third valve seat surface is formed in a stepped shape including an outer-diameter surface portion larger in diameter than the inner-diameter surface portion, a contact portion that extends continuously from the outer-diameter surface portion of the third valve section in a radially inward direction that is a direction at substantially right angles to the travel direction of the valve element, and can be brought into contact with the valve seat, an inclined portion that extends continuously from the contact portion, is smaller in diameter than the inner-diameter surface portion, and is inclined radially inwardly away from the second valve section, and a step extending continuously from the inclined portion in a radially inward direction that is a direction at substantially right angles to the travel direction of the valve element.

7. The displacement control valve according to claim 1, wherein the third valve seat surface is formed in a cylindrical shape having an inner-diameter surface portion, an outer-diameter surface portion, and a valve seat extending in a direction that is at right angles to the travel direction of the valve element, and the third valve section opposite the third valve seat surface is formed in a stepped shape including an outer-diameter surface portion larger in diameter than the inner-diameter surface portion, a contact portion that extends continuously from the outer-diameter surface portion of the third valve section in a radially inward direction that is a direction at substantially right angles to the travel direction of the valve element, and can be brought into contact with the valve seat, an inclined portion that extends continuously from the contact portion, is smaller in diameter than the inner-diameter surface portion, and is inclined radially inwardly away from the second valve section, and a step extending continuously from the inclined portion in a radially inward direction that is a direction at substantially right angles to the travel direction of the valve element.

8. A displacement control valve that controls a flow rate or pressure in a working control chamber according to a degree of opening of a valve unit, comprising:

a valve body including a first valve chest that communicates with first communicating passages for passing fluid at control pressure, a second valve chest that has a second valve seat surface for a valve hole communicating with the first valve chest and communicates with second communicating passages for passing fluid at discharge pressure, and a third valve chest that communicates with third communicating passages for passing fluid at suction pressure and has a third valve seat surface;

a valve element disposed in the valve body and having an intermediate communicating passage communicating with the first valve chest and the third communicating passages, the valve element having a second valve section that separates from and comes into contact with the second valve seat surface to open and close the valve hole communicating with the first valve chest and the second valve chest, a third valve section that opens and closes opposite to, and in conjunction with, the second valve section and separates from and comes into contact with the third valve seat surface to open and close communication between the intermediate communicating passage and the third communicating passages, and a first valve section that is disposed in the first valve chest and opens and closes in the same direction as, and in conjunction with, the second valve section;

a pressure-sensitive element that is disposed in the first valve chest and extends and contracts in response to suction pressure, the pressure-sensitive element having, at an extending and contracting free end thereof, a valve seat that separates from and comes into contact with the first valve section to open and close communication between the first valve chest and the intermediate communicating passage;

an auxiliary communicating passage provided in the first valve section in the first valve chest or in the valve seat for the first valve section, for enabling communication between an interior of the first valve chest and the intermediate communicating passage; and a solenoid unit mounted to the valve body for actuating the valve element in a travel direction to open and close the valve sections of the valve element according to a current, wherein an opening area between the third valve section and the third valve seat surface in a control area to control the flow rate or pressure in the working control chamber is set smaller than an area of the auxiliary communicating passage, and in the course of travel of the valve element from a closed state of the second valve section to a closed state of the third valve section, production of the opening area between the third valve section and the third valve seat surface changes from production by a travel direction gap in the travel direction of the valve element to production by a radial gap in a radial direction that is at right angles to the travel direction of the valve element, and the radial gap is set smaller than the area of the auxiliary communicating passage.

9. The displacement control valve according to claim 8, wherein the third valve seat surface is formed in a stepped shape including a large-diameter portion extending on a second valve chest side in the travel direction of the valve element, a valve seat extending continuously from the large-diameter portion in a direction that is at substantially right angles to the travel direction of the valve element, and a small-diameter portion extending continuously from the valve seat toward a proximal end, and the third valve section opposite the third valve seat surface has an opposing surface portion that is opposite the large-diameter portion and is smaller in diameter than the large-diameter portion and larger in diameter than the small-diameter portion, and a contact portion that can be brought into contact with the valve seat.

10. The displacement control valve according to claim 9, wherein the third valve seat surface is formed in a cylindrical shape having an inner-diameter surface portion, an outer-diameter surface portion, and a valve seat extending in a direction that is at right angles to the travel direction of the valve element, and the third valve section opposite the third valve seat surface is formed in a stepped shape including an outer-diameter surface portion larger in diameter than the inner-diameter surface portion, a contact portion that extends continuously from the outer-diameter surface portion of the third valve section in a radially inward direction that is a direction at substantially right angles to the travel direction of the valve element, and can be brought into contact with the valve seat, an inclined portion that extends continuously from the contact portion, is smaller in diameter than the inner-diameter surface portion, and is inclined radially inwardly away from the second valve section, and a step extending continuously from the inclined portion in a radially inward direction that is a direction at substantially right angles to the travel direction of the valve element.

11. The displacement control valve according to claim 8, wherein the third valve seat surface is formed in a cylindrical shape having an inner-diameter surface portion, an outer-diameter surface portion, and a valve seat extending in a direction that is at right angles to the travel direction of the valve element, and the third valve section opposite the third valve seat surface is formed in a stepped shape including an outer-diameter surface portion larger in diameter than the inner-diameter surface portion, a contact portion that extends continuously from the outer-diameter surface portion of the third valve section in a radially inward direction that is a direction at substantially right angles to the travel direction of the valve element, and can be brought into contact with the valve seat, an inclined portion that extends continuously from the contact portion, is smaller in diameter than the inner-diameter surface portion, and is inclined radially inwardly away from the second valve section, and a step extending continuously from the inclined portion in a radially inward direction that is a direction at substantially right angles to the travel direction of the valve element.

12. A displacement control valve that controls a flow rate or pressure in a working control chamber according to a degree of opening of a valve unit, comprising:

a valve body including a first valve chest that communicates with first communicating passages for passing fluid at control pressure, a second valve chest that has a second valve seat surface for a valve hole communicating with the first valve chest and communicates with second communicating passages for passing fluid at discharge pressure, and a third valve chest that communicates with third communicating passages for passing fluid at suction pressure and has a third valve seat surface;

a valve element disposed in the valve body and having an intermediate communicating passage communicating with the first valve chest and the third communicating passages, the valve element having a second valve section that separates from and comes into contact with the second valve seat surface to open and close the valve hole communicating with the first valve chest and the second valve chest, a third valve section that opens and closes opposite to, and in conjunction with, the second valve section and separates from and comes into contact with the third valve seat surface to open and close communication between the intermediate communicating passage and the third communicating passages, and a first valve section that is disposed in the first valve chest and opens and closes in the same direction as, and in conjunction with, the second valve section;

a pressure-sensitive element that is disposed in the first valve chest and extends and contracts in response to suction pressure, the pressure-sensitive element having, at an extending and contracting free end thereof, a valve seat that separates from and comes into contact with the first valve section to open and close communication between the first valve chest and the intermediate communicating passage;

an auxiliary communicating passage provided in the first valve section in the first valve chest or in the valve seat for the first valve section, for enabling communication between an interior of the first valve chest and the intermediate communicating passage; and a solenoid unit mounted to the valve body for actuating the valve element in a travel direction to open and close the valve sections of the valve element according to a current, wherein an opening area between the third valve section and the third valve seat surface in a control area to control the flow rate or pressure in the working control chamber is set smaller than an area of the auxiliary communicating passage, and the third valve seat surface is formed in a stepped shape including a large-diameter portion extending on a second valve chest side in the travel direction of the valve element, a valve seat extending continuously from the large-diameter portion in a direction that is at substantially right angles to the travel direction of the valve element, and a small-diameter portion extending continuously from the valve seat toward a proximal end, and the third valve section opposite the third valve seat surface has an opposing surface portion that is opposite the large-diameter portion and is smaller in diameter than the large-diameter portion and larger in diameter than the small-diameter portion, and a contact portion that can be brought into contact with the valve seat.

13. A displacement control valve that controls a flow rate or pressure in a working control chamber according to a degree of opening of a valve unit, comprising:

a valve body including a first valve chest that communicates with first communicating passages for passing fluid at control pressure, a second valve chest that has a second valve seat surface for a valve hole communicating with the first valve chest and communicates with second communicating passages for passing fluid at discharge pressure, and a third valve chest that communicates with third communicating passages for passing fluid at suction pressure and has a third valve seat surface;

a valve element disposed in the valve body and having an intermediate communicating passage communicating with the first valve chest and the third communicating passages, the valve element having a second valve section that separates from and comes into contact with the second valve seat surface to open and close the valve hole communicating with the first valve chest and the second valve chest, a third valve section that opens and closes opposite to, and in conjunction with, the second valve section and separates from and comes into contact with the third valve seat surface to open and close communication between the intermediate communicating passage and the third communicating passages, and a first valve section that is disposed in the first valve chest and opens and closes in the same direction as, and in conjunction with, the second valve section;

a pressure-sensitive element that is disposed in the first valve chest and extends and contracts in response to suction pressure, the pressure-sensitive element having, at an extending and contracting free end thereof, a valve seat that separates from and comes into contact with the first valve section to open and close communication between the first valve chest and the intermediate communicating passage;

an auxiliary communicating passage provided in the first valve section in the first valve chest or in the valve seat for the first valve section, for enabling communication between an interior of the first valve chest and the intermediate communicating passage; and a solenoid unit mounted to the valve body for actuating the valve element in a travel direction to open and close the valve sections of the valve element according to a current, wherein an opening area between the third valve section and the third valve seat surface in a control area to control the flow rate or pressure in the working control chamber is set smaller than an area of the auxiliary communicating passage, and the third valve seat surface is formed in a cylindrical shape having an inner-diameter surface portion, an outer-diameter surface portion, and a valve seat extending in a direction that is at right angles to the travel direction of the valve element, and the third valve section opposite the third valve seat surface is formed in a stepped shape including an outer-diameter surface portion larger in diameter than the inner-diameter surface portion, a contact portion that extends continuously from the outer-diameter surface portion of the third valve section in a radially inward direction that is a direction at substantially right angles to the travel direction of the valve element, and can be brought into contact with the valve seat, an inclined portion that extends continuously from the contact portion, is smaller in diameter than the inner-diameter surface portion, and is inclined radially inwardly away from the second valve section, and a step extending continuously from the inclined portion in a radially inward direction that is a direction at substantially right angles to the travel direction of the valve element.

* * * * *